July 27, 1937.  S. F. GLEASON  2,088,199
FILTER
Filed Feb. 1, 1936   2 Sheets-Sheet 1

INVENTOR
STANLEY F. GLEASON
BY
*Louis Necho*
ATTORNEY

July 27, 1937.  S. F. GLEASON  2,088,199
FILTER
Filed Feb. 1, 1936  2 Sheets-Sheet 2
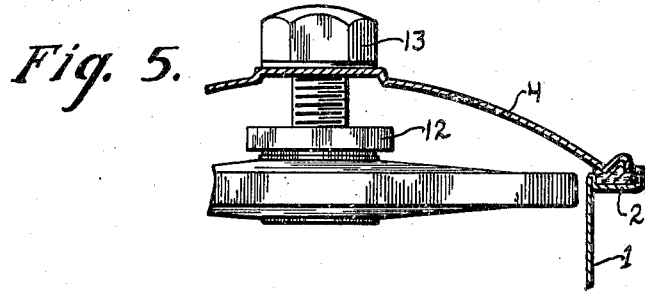
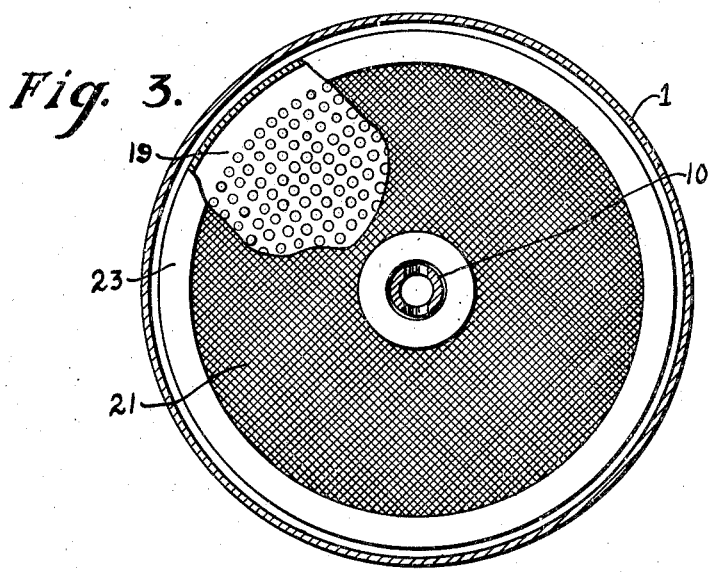
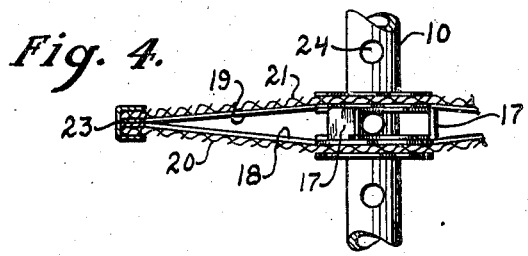
INVENTOR
STANLEY F. GLEASON
BY
ATTORNEY Patented July 27, 1937

2,088,199

UNITED STATES PATENT OFFICE 2,088,199

FILTER

Stanley F. Gleason, Philadelphia, Pa.

Application February 1, 1936, Serial No. 61,876

2 Claims. (Cl. 210—181)

My invention relates to a new and useful filter and it relates more particularly to a liquid filter of the kind ordinarily used for clarifying oils and more specifically to the type of filter ordinarily employed in connection with the lubricating system of internal combustion engines for clarifying the oil used therein.

My invention further relates to a filter of this character in which the filter surface is greatly increased without increasing the overall dimensions of the unit, thus greatly increasing the efficiency and serviceability of the filter.

My invention still further relates to a filter of this character in which I achieve uniformity of distribution of the oil being filtered over the filtering surfaces, thus insuring uniformity of deposit of the filterable sediment on the filtering surfaces, as distinguished from conventional filters in which the oil being filtered is forced to pass successively over different filtering surfaces, and in which the filtering surfaces on which the oil first impinges become clogged up thus rendering the unit useless before all of the filtering surfaces included therein have been clogged up.

My invention still further relates to a filter of this character in which the filtering elements or surfaces are individually removably and interchangeably mounted within the unit, and in which the cover of the unit can be removed so that the filtering elements can be either cleansed and replaced or exchanged for new ones, as distinguished from the conventional filters in which the filtering elements are unremovable, and in which the casing of the unit is permanently sealed thus necessitating the discarding of the unit in its entirety and involving unnecessary waste and expense.

My invention still further relates to a filter embodying all of the foregoing features, one which is less expensive to produce in the complete form and the replacement parts which can also be produced at a very low cost.

My invention still further relates to a filter of this character in which the cloth filtering elements used are firmly supported throughout their entire area as distinguished from the conventional filters in which the filtering cloth is draped over a helical spring or wire frame, and in which the filtering surfaces subjected to the impingement of the oil are entirely unsupported against the pressure of the oil thereon.

Other features of novelty and advantage will be more clearly understood from the following specification and the accompanying drawings in which;

Fig. 3 represents a section on line 3—3 of Fig. 2, with a part of the filtering element broken away to show the supporting plate.

Figs. 4 and 5 represent fragmentary views, partly in section and partly in elevation illustrating details of construction.

Figure 1:
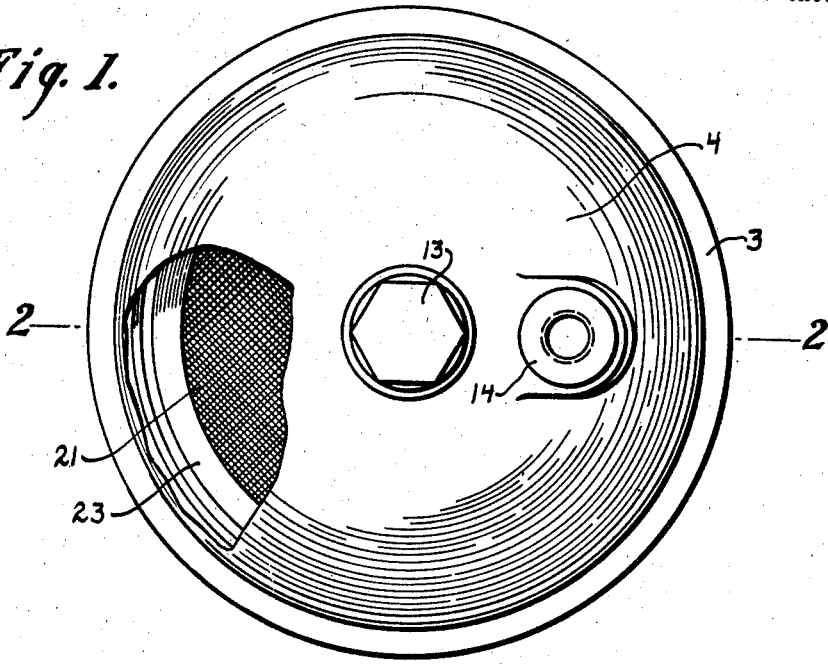
Fig. 1 represents a plan view of a filter embodying my invention.
Figure 2:
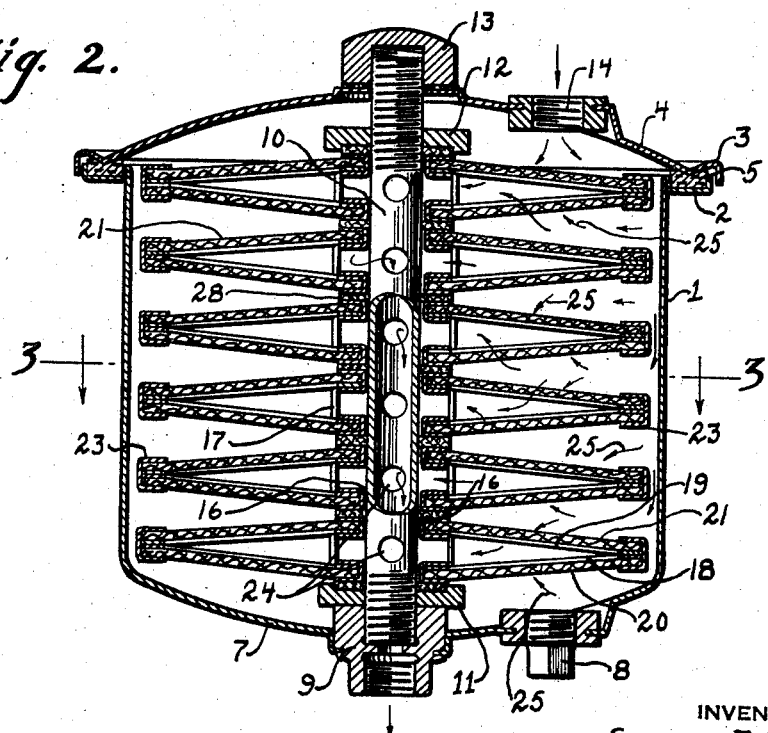
Fig. 2 represents a vertical section on line 2—2 of Fig. 1.

Referring to the drawings in which like reference characters indicate like parts, 1 designates the casing which is provided at one end thereof with the flange 2 on which is adapted to be clamped the flange 3 of the closure 4 impinging against the gasket 5. The casing 1 is preferably provided with an integral bottom 7 which is provided with the threaded plug 8 which may be removed to leave an inlet for the fluid to be filtered. In the bottom 7 of the unit is also secured the threaded bushing 9 which forms an outlet for the fluid and in which is threaded one end of the hollow stem 10 which is retained by the nut 11. The other end of the stem 10 is also threaded and retained by the nut 12 and by the nut cap 13 which serves to clamp the cover 4 over the casing, in the manner best illustrated in Fig. 2. 14 designates a second inlet which can be used alternately with the first mentioned inlet 8, as desired. Within the casing 1, and slidably mounted on the stem 10, I provide annular supporting and spacing rings having their upper edges deflected into U shape elements with the base of the U abutting against the stem as at 16, and with one of the legs of the U (as viewed downwardly in Fig. 2) provided with a pendant leg 17 which serves as a spacer for the adjacent pair of perforated supporting plates 18 and 19 over which are draped the filtering cloths 20 and 21, respectively. The inner edges of the perforated plates 18 and 19 and of the filtering cloths 20 and 21 draped thereon are clamped in the U part of the supporting and spacing rings, while the outer edges of the supporting plates 18 and 19 and of the filtering cloths 20 and 21 are clamped in the U shaped rings 23. It will thus be seen that by this construction the supporting plates 18 and 19 and the covering filtering cloths 20 and 21 are formed into cones with their converging ends disposed outwardly from the centrally supporting stem 10. The supporting stem 10 is made hollow, as seen in Fig. 2, and is provided with a plurality of apertures 24 through which the oil flows into the outlet 9 after it passes through the conical filtering units. Intermediate each pair of adjacent conical filtering units I position a suitable gasket 28 to prevent any leakage of the unfiltered oil into the interior of the hollow stem 10.

The operation is as follows; the oil to be filtered is introduced through either of the inlets 8 or 14, or through both of them, and the oil will then flow in the direction of the arrows to surround the conical filter units and to pass through the covering filter cloths 20 and 21 and through the supporting perforated plates 18 and 19 as best indicated by the arrows 25. After the oil has passed through the filtering cloth, and the supporting plate, it enters the apertures 24 and flows through the hollow stem 10 into the outlet 9.

In the event that one or more of the conical filtering units described becomes impervious due to excessive deposit of sediment thereon, or if one of said units should break or be otherwise damaged, or if it is desired to remove all of the units in order to cleanse the same, it is merely necessary to loosen the nut cap 13 whereupon the cover 4, in its entirety, can be removed. The nut 12 is then unthreaded from the end of the stem 10 and each of the conical units, formed of a pair of adjacent supporting plates 18 and 19, filter cloths 20 and 21, inner supporting, spacing and clamping ring 17 and outer clamping ring 23, is removed separately.

It will thus be seen that by this construction the outer casing 1 and its adjuncts, as well as the cover 4, all of which constitute items of expense in the manufacture of a filter of this character, are saved and need not be discarded when the filtering element is exhausted, and it will further be seen that by this arrangement I provide greatly enlarged filtering surfaces over which the oil being filtered may flow. It will also be seen that each of the conical filtering units is exposed to the flow of oil thereabout and therethrough to the same extent as every other conical filtering unit, thus insuring uniformity of action and hence reducing the danger of breakage due to excessive pressure resulting from the undue clogging of any one filtering unit.

It will also be apparent that my novel conical filtering units are formed of the converging perforated plates which are extremely inexpensive to produce by a single stamping operation, and that the same is true of the inner and outer retaining rings, which are easily fabricated and clamped on the inner and outer ends of the perforated plates.

While I have shown and described my novel filter in a form especially adapted for use in filtering the oil from the crank case of an internal combustion engine I want it clearly understood that the same construction can be embodied in larger units, for industrial use in connection with any desired liquid, without departing from the spirit or scope of my invention, sacrificing any of its advantages, or materially altering the principles it embodies.

Having thus described my invention, what I claim as new and desire to secure by Letters Patent is:

1. A filter comprising a casing having inlet and outlet openings, a perforated hollow stem extending substantially the length of said casing, a plurality of spacing rings freely mounted on said stem with the opposite edges of said rings deflected to form U-shaped elements, a plurality of pairs of flat, outwardly converging, perforated filter plates, fabric coverings therefor, the inner edges of said plates and coverings being positioned in said U-shaped elements, an annular clamping element for securing together the outer converging edges of said pairs of plates and said coverings, and means near either end of said stem for applying pressure to said U-shaped elements to clamp together the edges of said plates and coverings, said hollow stem communicating with one of said openings through said plates and coverings.

2. A filter comprising a casing having an integral bottom and a removable top, there being ports in said bottom and said top, a perforated hollow stem extending through said casing and secured to said bottom in registration with an opening therein, a plurality of spacing rings removably mounted on said stem comprising annular body portions and U-shaped elements formed from the opposite edges thereof, a plurality of pairs of flat, outwardly converging, perforated plates, fabric coverings therefor, the inner edges of said plates and coverings being positioned in said U-shaped elements, an annular clamping element for securing together the outwardly converging edges of said pairs of plates and said coverings, means near either end of said stem for applying pressure to said U-shaped elements to clamp together the edges of said plates and said coverings, said hollow stem communicating with one of the remaining openings in said casing through said plates and coverings, and means for securing the other end of said hollow stem to said removable top.

STANLEY F. GLEASON.